United States Patent
Freedman et al.

(10) Patent No.: US 9,213,463 B2
(45) Date of Patent: Dec. 15, 2015

(54) GRAPHICAL OBJECT CLASSIFICATION

(75) Inventors: Daniel Freedman, Zikhron Yaaqov (IL); Pavel Kisilev, Maalot (IL); Anastasia Dubrovina, Haifa (IL); Sagi Schein, Haifa (IL); Ruth Bergman, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 152 days.

(21) Appl. No.: 14/004,512

(22) PCT Filed: Apr. 7, 2011

(86) PCT No.: PCT/US2011/031615
§ 371 (c)(1),
(2), (4) Date: Sep. 11, 2013

(87) PCT Pub. No.: WO2012/138343
PCT Pub. Date: Oct. 11, 2012

(65) Prior Publication Data
US 2014/0006984 A1 Jan. 2, 2014

(51) Int. Cl.
*G06F 3/048* (2013.01)
*G06F 3/0481* (2013.01)
*G06F 3/0482* (2013.01)
*G06K 9/00* (2006.01)
*G06K 9/46* (2006.01)

(52) U.S. Cl.
CPC ............ *G06F 3/0481* (2013.01); *G06F 3/0482* (2013.01); *G06K 9/00476* (2013.01); *G06K 9/4647* (2013.01)

(58) Field of Classification Search
CPC .................................................. G06F 3/0482
USPC ........................................................ 715/764
See application file for complete search history.

(56) References Cited

U.S. PATENT DOCUMENTS

| | | | |
|---|---|---|---|
| 6,708,167 B2 | 3/2004 | Lee et al. | |
| 7,369,129 B2 | 5/2008 | Mori et al. | |
| 7,716,322 B2 | 5/2010 | Benedikt et al. | |
| 8,887,160 B2 * | 11/2014 | Lehavi | G06F 9/5027 718/100 |
| 2005/0238257 A1 | 10/2005 | Kaneda et al. | |
| 2005/0271280 A1 | 12/2005 | Farmer et al. | |
| 2007/0106950 A1 * | 5/2007 | Hutchinson et al. | 715/761 |
| 2007/0234121 A1 | 10/2007 | He et al. | |
| 2008/0170792 A1 | 7/2008 | Ono et al. | |

(Continued)

FOREIGN PATENT DOCUMENTS

| | | |
|---|---|---|
| CN | 101655817 | 2/2010 |
| KR | 10-0350793 | 9/2002 |
| KR | 10-0510404 | 8/2005 |

OTHER PUBLICATIONS

International Preliminary Report on Patentability, Oct. 17, 2013, PCT Application No. PCT/US2011/031615.

(Continued)

*Primary Examiner* — William Titcomb
(74) *Attorney, Agent, or Firm* — Hewlett-Packard Patent Department

(57) ABSTRACT

In one implementation, a graphical object classification system includes an acquisition module, a signature generation module, and a classification module. The acquisition module accesses a representation of a graphical object. The signature generation module generates an appearance-invariant signature of the graphical object based on the representation. The classification module classifies the graphical object based on the appearance-invariant signature.

20 Claims, 9 Drawing Sheets

(56) References Cited

U.S. PATENT DOCUMENTS

2009/0210749 A1     8/2009   Hayutin
2014/0146370 A1*   5/2014   Banner ................ G06K 9/6232
                                                                      358/406

OTHER PUBLICATIONS

English translation (machine-generated) of Abstract from Chinese Patent Publication No. CN-101655817.

International Search Report and Written Opinion, Dec. 7, 2013, Hewlett-Packard Development Company, LP, Application No. PCT/US2011/031615, filed Apr. 7, 2011.

European Patent Office, EP Supplementary Search Report of EP1862966.6, Jan. 13, 2015, 5 pages.

Tabbone, S et al., "A new shape descriptor defined on the Radon transform." Computer Vision and Image Understanding 102.1, Apr. 1, 2006, pp. 42-51.

Hoang, T. V., Image Representations for Pattern Recognition, PhD. Thesis, Université Nancy II, Dec. 19, 2014, 214 pages.

Hoang, Thai V et al., "A Geometric Invariant Shape Descriptor Based on the Radon, Fourier, and Mellin Transforms," Pattern Recognition (ICPR), Aug. 23, 2010, 4 pages.

Wang, et al. "Scaling and rotation invariant analysis approach to object recognition based on Radon and Fourier-Mellin transforms." Pattern Recognition 40.12, Aug. 11, 2007, 6p.

Yeh, Tom et al., "Sikuli: Using GUI Screenshots for Search and Automation," 22nd Annual ACM Symposium on User Interface Software and Technology, Oct. 4, 2009, 10 pages.

Chen, et al., "Invariant Description and Retrieval of Planar Shapes Using Radon Composite Features." IEEE Transactions on Signal Processing, vol. 56, No. 10, Oct. 1, 2008, 10p.

\* cited by examiner

GRAPHICAL OBJECT CLASSIFICATION

CROSS-REFERENCE TO RELATED APPLICATION

This application is a U.S. National Stage Application of and claims priority to International Patent Application No. PCT/US2011/031615, filed on Apr. 7, 2011, and entitled "GRAPHICAL OBJECT CLASSIFICATION."

BACKGROUND

Graphical object classification systems classify graphical objects (e.g., icons, portions of images, buttons, etc.) to determine the types or classes of those graphical objects. This classification can be useful to determine which graphical objects are included within an image. Alternatively, such classification can be useful to identify a graphical object or objects of a particular type or class.

Typically, graphical object classification systems classify graphical objects using templates. That is, graphical objects are compared with templates and are classified into classes associated with the templates matched or satisfied by those graphical objects (e.g., the templates the graphical objects most similarly resemble).

DETAILED DESCRIPTION

Figure 1:
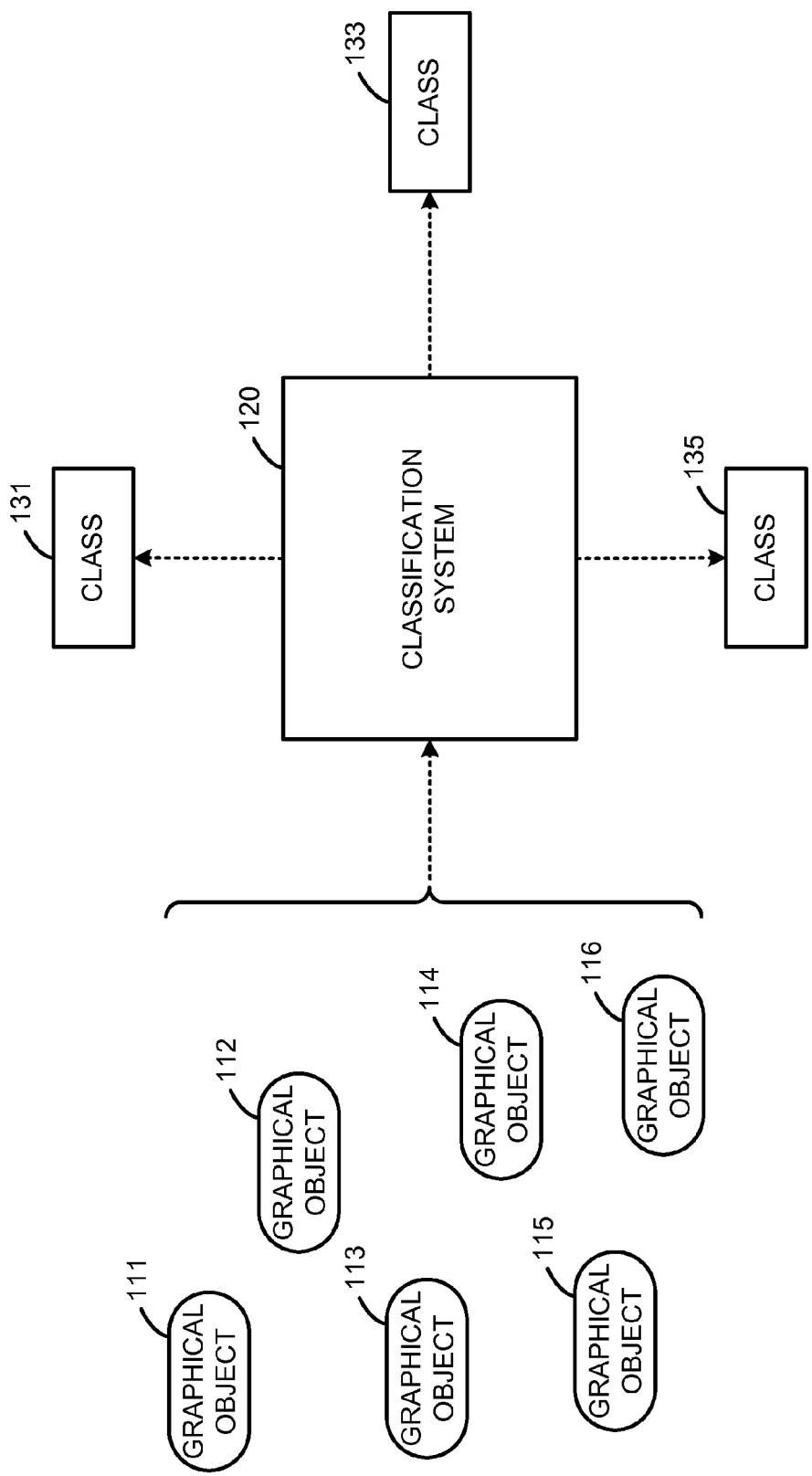
FIG. 1 is an illustration of classification of a group of graphical objects, according to an implementation.

Graphical objects are typically classified by graphical object classification systems (or classification systems) based on templates of the graphical objects. That is, to classify a graphical object, that graphical object is compared with a group of templates, each of which is related to a class (or type) of graphical object. If the graphical object matches (or satisfies) a template, that graphical object is classified in the class related to that template.

The appearance of graphical objects can be altered, however, due to changes in resolution of a display, parameters of a graphical user interface, and/or color inversion of an image, for example. Furthermore, the appearance of graphical objects can change temporarily or dynamically. For example, the appearance of a graphical object can change as a user interacts with the graphical object or based on a status associated with the graphical object. As specific examples, the color, shading, or other attribute of a graphical object can change when a user moves a mouse pointer over the graphical object, when the user selects the graphical object with a mouse pointer (e.g., clicks on the graphical object), or when a functionality associated with the graphical object is not available. As another example, the appearance of a graphical object can change when a notification or message from a software application associated with the graphical object is available. Specifically, for example, the appearance of a graphical object (e.g., an icon) associated with an electronic mail software application can change when there are unread messages in an electronic mailbox.

As a result of such changes in appearance or transformations, classifying graphical objects based on templates can be unreliable after a transformation of a graphical object. Moreover, generating templates for each possible transformation or appearance of a graphical object can be impractical and inefficient due to data storage restraints and/or the number of possible transformations.

Implementations discussed herein classify graphical objects based on appearance-invariant signatures of those graphical objects. For example, an appearance-invariant signature can be generated based on a representation (e.g., a bitmap representation or a representation based on a matrix of pixel values) of a graphical object. Such representations can be referred to as graphical object representations. The appearance-invariant signature is then used to classify the graphical object at a classification module. That is, the appearance-invariant signature is a proxy for the graphical object during classification of the graphical object.

The appearance-invariant signature has attributes or characteristics that vary little in response to changes in the appearance (e.g., changes due to transformations) of the graphical object. Thus, a graphical object can be classified into the same class before and after a transformation of the graphical object. Said differently, a graphical object classified into a class using an appearance-invariant signature generated from a representation of the graphical object before a transformation is classified into the same class using another appearance-invariant signature generated from a representation of the graphical object after the transformation.

Such classification systems can be used within a variety of environments. For example, such classification systems can be used to classify icons (i.e., graphical objects) included within synthetic or artificial images such as graphical user interfaces or other images that include icons. That is, a classification system can be used to analyze an image and determine what classes (or types) of icons are included within that image.

As a specific example, such classification systems can be particularly beneficial to software automation. For example, a software automation tool can be configured to perform some task within a graphical user interface ("GUI"). That is, the software automation tool performs the task by manipulating (e.g., clicking on or emulating mouse clicks at) controls of the GUI. Because the appearance of the GUI can change (e.g., be transformed due to application of a skin or new visual layer to the GUI), classification of the controls of the GUI (i.e., the graphical objects of the GUI) using appearance-invariant signatures can mitigate or prevent changes in classification of the controls after the change in appearance.

As used herein, the singular forms "a," "an," and "the" include plural referents unless the context clearly dictates otherwise. Thus, for example, the term "graphical object" is intended to mean one or more graphical objects or a combination of graphical objects. Additionally, as used herein, the term "module" refers to hardware (e.g., a processor or circuitry) and/or software (e.g., firmware, programming, machine- or processor-executable instructions, commands, or code) that is stored at a memory and executed or interpreted (or hosted) at a processor. In other words, a module can be hardware and/or a combination of hardware and software stored at a memory accessible to the hardware.

FIG. 1 is an illustration of classification of a group of graphical objects, according to an implementation. Graphical objects 111-116 are each provided to classification system 120 at which graphical objects 111-116 are classified into classes (or object classes) 131, 133, and/or 135. For example, graphical objects 111-116 can be provided to classification system 120. Classification system 120 classifies graphical objects using appearance-invariant signatures 111-116 based on, for example, attributes (e.g., features, characteristics, and/or properties) of graphical objects 111-116. That is, each graphical object of graphical objects 111-116 is associated (e.g., grouped or related) with other graphical objects that have the same of similar attributes as that graphical object. Thus, some graphical objects of graphical objects 111-116 are classified into class 131, other graphical objects of graphical objects 111-116 are classified into class 133, and yet other graphical objects of graphical objects 111-116 are classified into class 135.

Classification system 120 can identify the class of classes 131, 133, and 135 into which each graphical object from graphical objects 111-116 is classified using a variety of methodologies. For example, classification system 120 can store graphical objects in (or of or having) a common class at a portion of a data store such as a database table or file system directory associated with (or designated for) graphical objects in that class. As another example, classification system 120 can annotate or apply a watermark to each a graphical object to indicate or identify the class in which that graphical object is included. As yet another example, classification system 120 can output (e.g., to a display device, via communications link, to a database, or to a file) an identifier of a class in which a graphical object is included after that graphical object is processed or analyzed, for example, as discussed in more detail herein, at classification system 120. In some implementations, classification system 120 can output an identifier of the graphical object (e.g., a name or a reduced-size copy of the graphical object (i.e., a thumbnail)) and an identifier of the class in which the graphical object is included.

Graphical objects are portions of an image. For example, graphical objects can be icons within an image. Icons are portions of an image or sub-images within an image that represent a resource and/or a functionality. As a specific example, controls within a GUI are icons that represent resources and/or functionalities available or accessible via the GUI. Examples of such controls include control buttons (e.g., push buttons and radio buttons), check boxes, edit boxes, lists (e.g., scroll lists and drop-down lists), applications access controls (e.g., icons that represent software applications), file access controls (e.g., icons that represent files), and resource access control (e.g., icons that represent resources such as services accessible via a communications link).

Figure 2:
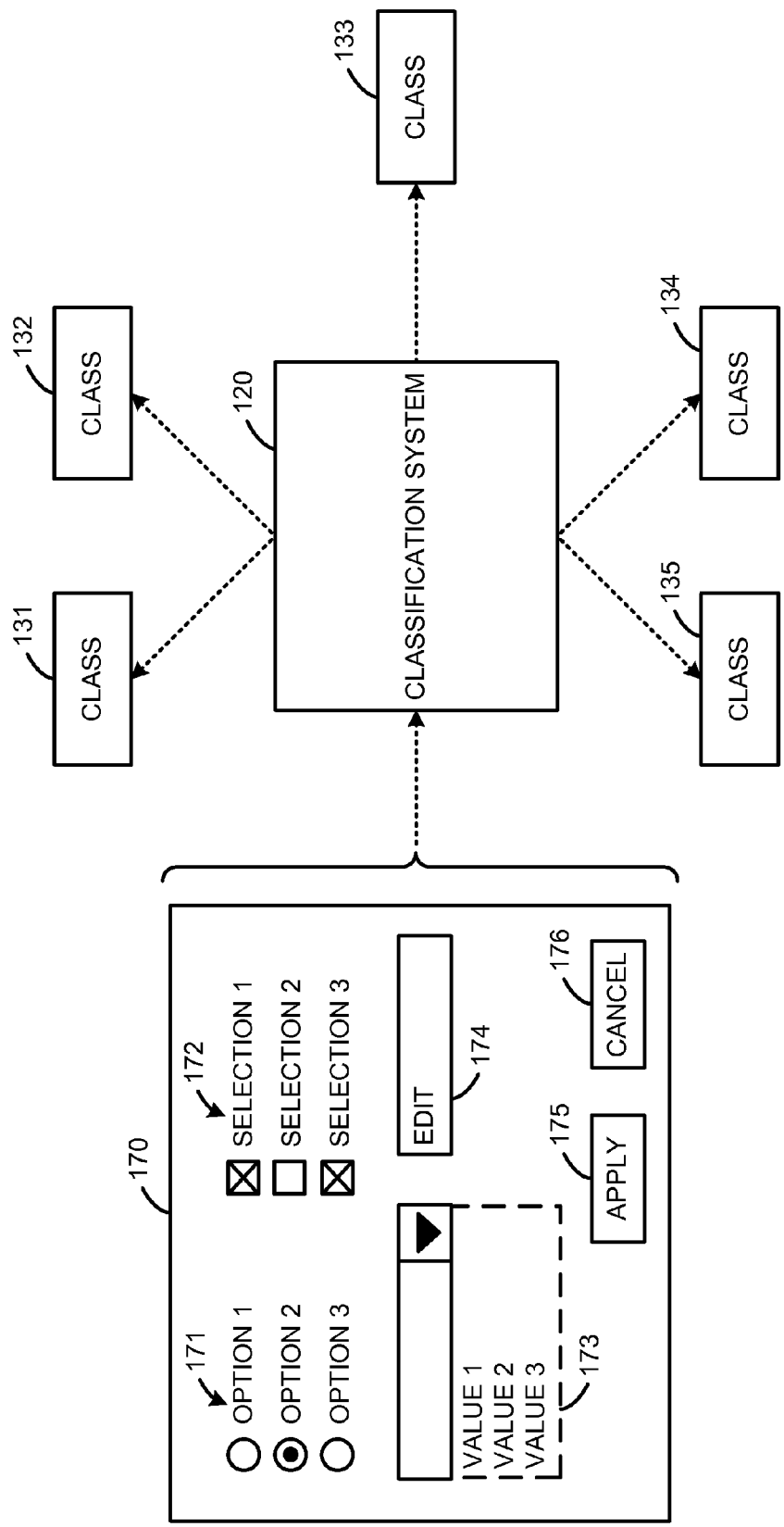
FIG. 2 is an illustration of classification of a group of controls at a graphical user interface, according to an implementation.

As a specific example of graphical objects that are controls within a GUI, FIG. 2 is an illustration of classification of a group of controls at a graphical user interface, according to an implementation. Graphical user interface 170 illustrated in FIG. 2 includes radio button group 171 with three radio button controls (labeled "OPTION 1," OPTION 2," and "OPTION 3"), check box group 172 with three check box controls (labeled "SELECTION 1," SELECTION 2," and "SELECTION 3"), drop-down list control 173 (including entries "VALUE 1," VALUE 2," and "VALUE 3"), edit box control 174, and push button controls 175 and 176. In other implementations, graphical user interface 170 can include additional or fewer controls that the controls illustrated in FIG. 2. For example, graphical user interface 170 can exclude edit box control 174 and can include an application access control (e.g., an icon) that represents an application and causes the application to be executed at a computing device hosting graphical user interface 170.

Classification system 120 accesses controls 171-176 (or representations thereof) at graphical user interface 170 and classifies controls 171-176 into classes 131-135. Class 131 is associated with radio button controls. Thus, classification system 120 classifies each radio button control of radio button group 171 into class 131. In some implementations, classification system 120 also classifies radio button group 171 into class 131. That is, classification system 120 classifies the individual radio button controls (i.e., each radio button and associated text) and radio button group 171 (i.e., the aggregate of the individual radio button controls) into a common class. In other implementations, classification system 120 classifies the individual radio button controls and radio button group 171 into different classes.

Similarly, classification system 120 classifies each check box control of check box group 172 into class 132. Class 132 is associated with check box controls. In some implementations, classification system 120 also classifies check box group 172 into class 132. That is, classification system 120 classifies the individual check box controls (i.e., each check box and associated text) and check box group 172 (i.e., the aggregate of the individual check box controls) into a common class. In other implementations, classification system 120 classifies the individual check box controls and check box group 172 into different classes.

Classification system 120 classifies drop-down list control 173 into class 133. Class 133 is associated with drop-down list controls. Classification system 120 classifies edit box control into class 134. Class 134 is associated with edit box controls. Classification system 120 classifies push buttons 175 and 1766 into class 135. Class 135 is associated with push button controls.

Said differently, classification system 120 classifies controls 171-176 at graphical user interface 170 into various classes using appearance-invariant signatures based on attributes of controls 171-176 (or of the representations of controls 717-176) such that the control in each class of classes 131-135 share common attributes. In some implementations, classification system 120 can classify controls into additional, fewer, and/or other classes than illustrated in FIG. 2.

Figure 3:
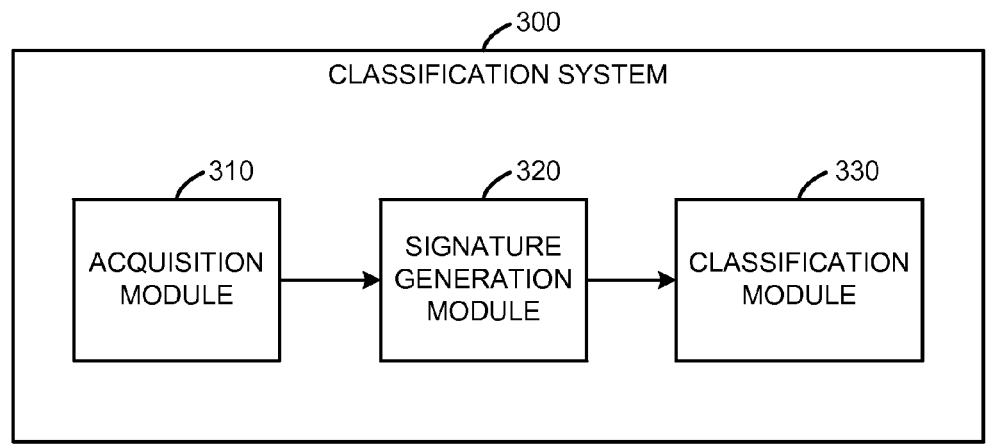
FIG. 3 is an illustration of a classification system, according to an implementation.

FIG. 3 is an illustration of a classification system, according to an implementation. Classification system 300 includes acquisition module 310, signature generation module 320, and classification module 330. Typically, data sets (or information) related to classification of a graphical object flow through classification system 300 as illustrated in FIG. 3. Furthermore, in some implementations, classification system 300 includes an output module such as a database, file system, communications interface module, or display interface via which classification system 300 can output identifiers of classes in which graphical objects input to and/or access at classification system 300 are included.

Acquisition module 310 includes hardware such as a processor or application-specific integrated circuit ("ASIC"), software stored at a memory and executed from the memory at a processor, or a combination thereof to access representations of graphical objects. For example, acquisition module 310 can be a screen capture utility (e.g., a software application) hosted at a processor. Signature generation module 320 includes hardware such as a processor or ASIC, software stored at a memory and executed from the memory at a processor, or a combination thereof to generate appearance-invariant signatures of graphical objects. Classification module 330 includes hardware such as a processor or ASIC, software stored at a memory and executed from the memory at a processor, or a combination thereof to classify graphical objects based on appearance-invariant signatures of those graphical objects. For example, classification module 330 can be a classification software library including object codes hosted at a processor.

Figure 4:
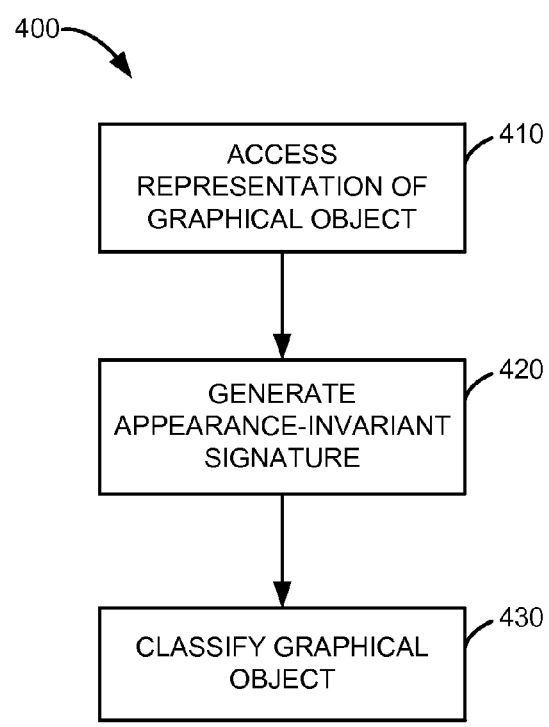
FIG. 4 is a flowchart of a process to classify a graphical object, according to an implementation.

FIG. 4 is a flowchart of a process to classify a graphical object, according to an implementation. Process 400 can be implemented as a hardware module, as a software module hosted at a computing device, and/or as a combination of a hardware module and a software module. For example, process 400 can be implemented as application-specific circuitry or as a software module including instructions stored at a memory and executed at a processor in communication with the memory. More specifically, for example, process 400 can be implemented at a classification system such as classification system 300.

A representation of a graphical object such as a GUI control is accessed at block 410. For example, acquisition module 310 can receive a bitmap representation of a GUI. As a specific example, classification system 300 is hosted at a computing device hosting the GUI, and acquisition module 310 generates a screenshot of the GUI. Acquisition module 310 can then parse the screenshot to access bitmap representations of the controls at the GUI. For example, acquisition module 310 can apply an edge-detection filter to the GUI and select portions of the GUI for which the edge-detection filter generated rectangular features. The selected portions (e.g., portions of the GUI screenshot) are then used as representations of the controls at the GUI. More specifically, in this example, the portions of the GUI screenshot are accessed by acquisition module 310 as bitmap representations of the controls.

As another example, representations such as bitmap representations of graphical objects can be provided to acquisition module 310 via, for example, a communications interface module or application programming interface ("API") of classification system 300. Moreover, representations of individual graphical objects can be accessible to classification system 300 at a data store (i.e., a data storage device, a data storage service, or a combination thereof), and acquisition module 310 can access representations of graphical objects at that data store.

An appearance-invariant signature of the graphical object is then generated from the representation of the graphical object at block 420. For example, acquisition module 310 provides the representation of a graphical object to signature generation module 320, and signature generation module 320 generates the appearance-invariant signature of the graphical object. An appearance-invariant signature of a graphical object is a value or a collection of values (i.e., a vector) that is used to classify the graphical object, and includes (or has) attributes that do not significantly change in response to variations in the graphical object. That is, an appearance-invariant signature of a graphical object is generated from a representation of the graphical object and includes attributes substantially the same as or identical to another appearance-invariant signature generated from a representation of the graphical object after a transform.

In other words, the two appearance-invariant signatures are substantially the same or identical one to another within a classification system (or to a classification module such as classification module 330). Two (or more) appearance-invariant signatures are substantially the same or identical if a classification module classifies the graphical objects represented by those appearance-invariant signatures into the same class. That is, the appearance-invariant signatures are substantially the same or identical if a classification module produces a common classification result for each appearance-invariant signature. Said differently, an appearance-invariant signature based on a transformed graphical object is substantially the same or identical to an appearance-invariant signature based on the original graphical object (i.e., the transformed graphical object before it was transformed) if the graphical object is classified into the same class for each appearance-invariant signature.

A graphical object is transformed if it is altered or changes to have a different appearance. That is, a transformation of a graphical object is a change in color, shape, size, orientation, or other attribute of the graphical object. As an example, applying a new skin or visual layer to a GUI can transform the controls of the GUI. That is, the appearance of the controls is altered, but the functionalities of those controls remain the same. FIGS. 5-8 illustrate graphical objects before and after various transformations.

Figure 5:
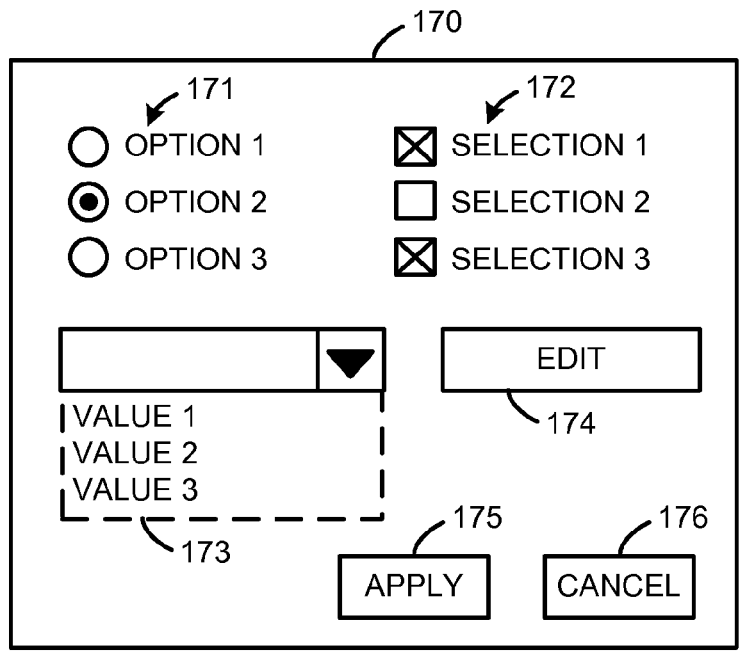
FIG. 5 is an illustration of the graphical user interface of FIG. 2, according to an implementation.

FIG. 5 is an illustration of the graphical user interface of FIG. 2, according to an implementation. Controls 171-176 are similar to those described above in relation to FIG. 2, and the illustration of graphical user interface 170 in FIG. 5 can be referred to as the original (or untransformed) state of graphical user interface 170.

Figure 6:
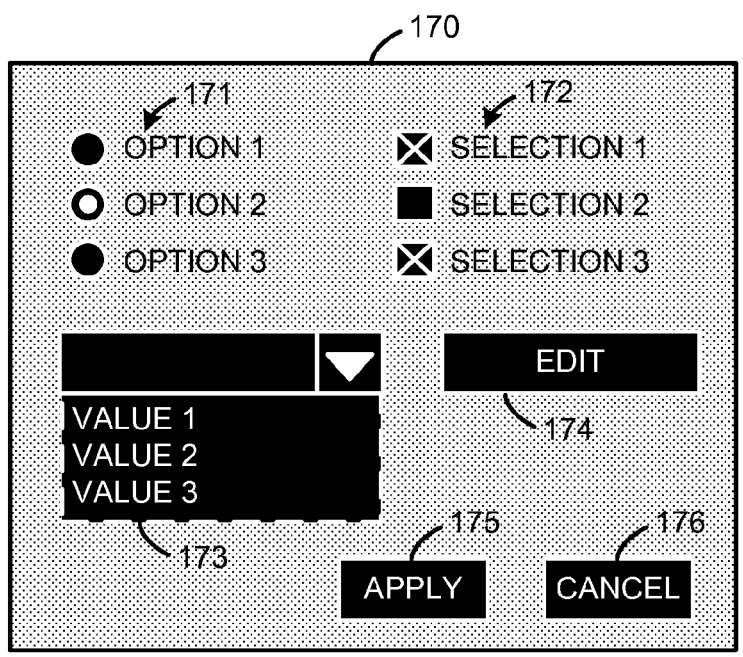
FIG. 6 is an illustration of the graphical user interface of FIG. 2 after a transformation, according to an implementation.

FIG. 6 is an illustration of the graphical user interface of FIG. 2 after a transformation, according to an implementation. As illustrated in FIG. 6, graphical user interface 170 has experience or undergone or been subject to a color transformation. Specifically as illustrated in FIG. 6, the colors of controls 171-176 have been inverted.

Figure 7:
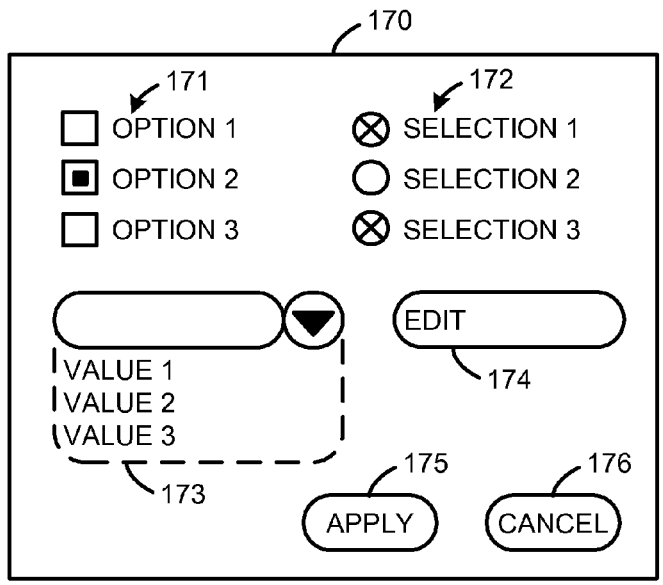
FIG. 7 is an illustration of the graphical user interface of FIG. 2 after a transformation, according to an implementation.

FIG. 7 is an illustration of the graphical user interface of FIG. 2 after a transformation, according to an implementation. As illustrated in FIG. 7, the shapes of controls 171-176 have been altered. Said differently, a skin or different visual layer has been applied to graphical user interface 170. As specific examples of resulting changes to the appearance of graphical user interface 170, the radio button controls of radio button group 171 have been altered from circles to squares. Additionally, the corners of controls 172-176 have been rounded.

Figure 8:
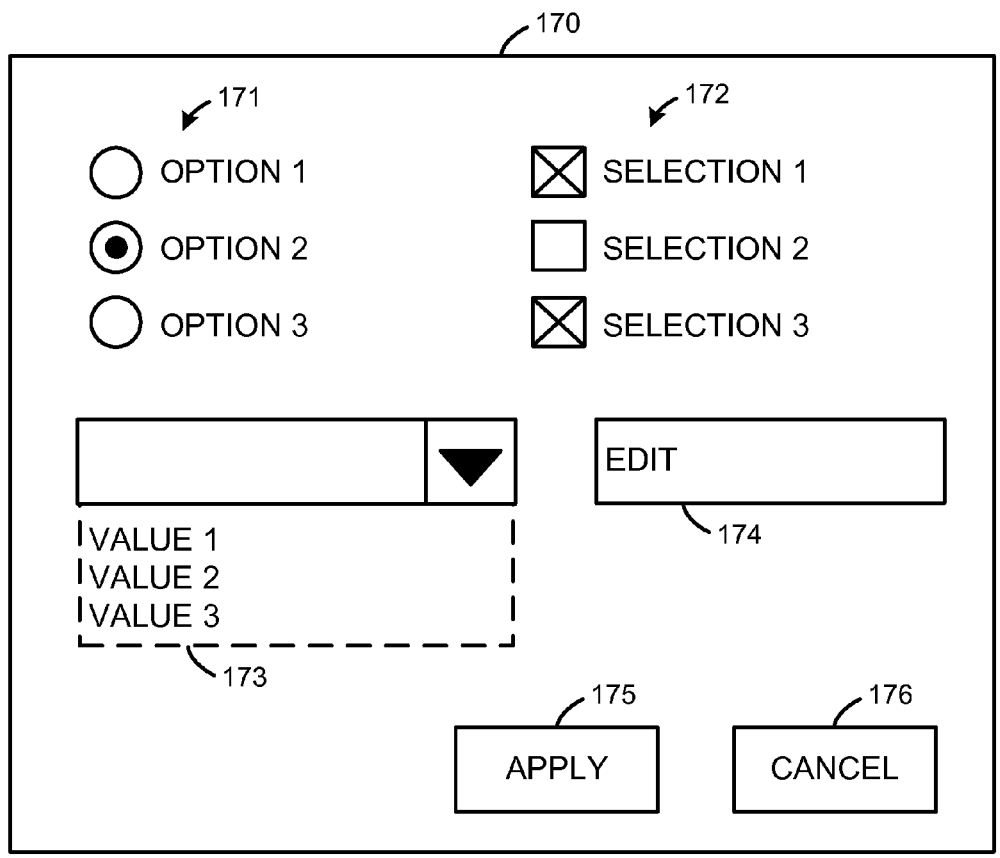
FIG. 8 is an illustration of the graphical user interface of FIG. 2 after a transformation, according to an implementation.

FIG. 8 is an illustration of the graphical user interface of FIG. 2 after a transformation, according to an implementation. As illustrated in FIG. 8, graphical user interface 170 and controls 171-176 have been enlarged. For example, user interface 170 and controls 171-176 can be enlarged in response to a change in the resolution of a display that outputs graphical user interface 170.

As illustrated in FIGS. 5-8 the controls of a GUI can have altered appearances due to changes in resolution of a display, a visual layer, color options, and/or other parameters. Moreover, the appearance of other graphical objects can change due to these and/or other parameters. As a result of such changes, classifying graphical objects based on templates (i.e., graphical objects accessed at an earlier time and associated with particular classes) can be unreliable after a transformation of a graphical object. Moreover, generating templates for each possible transformation or appearance of a graphical object can be impractical and inefficient due to data storage limitations and/or the number of possible transformations. Accordingly, an appearance-invariant signature can be used to classify a graphical object to prevent or mitigate changes in classification of that graphical object after it has been transformed.

Referring to FIG. 4, the graphical object is then classified using the appearance-invariant signature at block 430. With reference to FIG. 3, signature generation module 320 provides the appearance-invariant signature for the graphical object to classification module 330, and classification module 330 classifies the graphical object into a class. That is, classification module 330 determines into which class a graphical object will be classified based on the appearance-invariant signature for the graphical object. Said differently, classification module 330 can determine or identify appearance-invariant signatures that share common attributes and group or classify those appearance-invariant signatures (or the graphical objects related thereto) into classes.

As a specific example, classification module 330 can implement a support vector machine ("SVM") such an SVM utilizing a Gaussian kernel. In other words, classification module 330 can be a support vector machine based classification module. In some implementations, the SVM or the SVM kernel has been previously trained. For example, the SVM can have been configured using a supervised training procedure in which groups of appearance-invariant signatures for each of a variety of classes were provided to the SVM. The SVM then generates or defines support vectors that are used by the SVM to discriminate between appearance-invariant signatures of graphical objects from those classes (i.e., to identify the attributes of the appearance-invariant signatures associated with those classes) to classify the graphical objects.

Alternatively, the SVM can be configured using an unsupervised training methodology in which a group of appearance-invariant signatures are provided to the SVM, and the SVM then generates or defines support vectors to separate the appearance-invariant signatures into classes (or groups) the SVM determines are significant (e.g., differ by some measure such as a statistical, geometric, or Euclidean measure). In other implementations, other classification modules and/or training methodologies can be used.

In other implementations, classification module 330 can be a different type of classification module. For example, classification module 330 can be based on K-means clustering, Mean-Shift clustering, or GrabCut clustering.

Process 400 can include additional or fewer blocks than those illustrated in FIG. 4. For example, process 400 can include an additional block at which an identifier of the class into which a graphical object is classified can be output, for example, to a log file, to a user at a display, or via a communications link. As another example, multiple appearance-invariant signatures can be used to classify a graphical object. In other words, block 420 can be repeated to generate multiple appearance-invariant signatures, and the graphical object can be classified based on two or more appearance-invariant signatures. For example, the appearance of some graphical objects can change temporarily or dynamically, for example, as a user interacts with the graphical object or based on a status associated with the graphical object. More specifically, for example, the color, shading, or other attribute of a graphical object can change when a user moves a mouse pointer over the graphical object or when the user selects the graphical object with a mouse pointer. An appearance-invariant signature can be generated before the user interacts with the graphical object and another appearance-invariant signature can be generated while the user interacts with the graphical object. Both appearance-invariant signatures can then be used to classify the graphical object.

As a specific example, a button at a GUI can have a default appearance (or state), a shaded appearance when a mouse pointer is over (i.e., hovers on) the button, and a depressed appearance when the button is selected. An appearance-invariant signature can be generated for each appearance (or state) of the button and the button can be classified using each of the appearance-invariant signatures. That is, each of the appearance-invariant signatures can be provided to a classification module to classify the button.

Additionally, one or more blocks of process 400 can be rearranged. For example, process 400 can be repeated for multiple graphical objects such as controls at a GUI. Furthermore, although process 400 is discussed above with reference to an example environment within classification system, process 400 is applicable within other environments.

Figure 9:
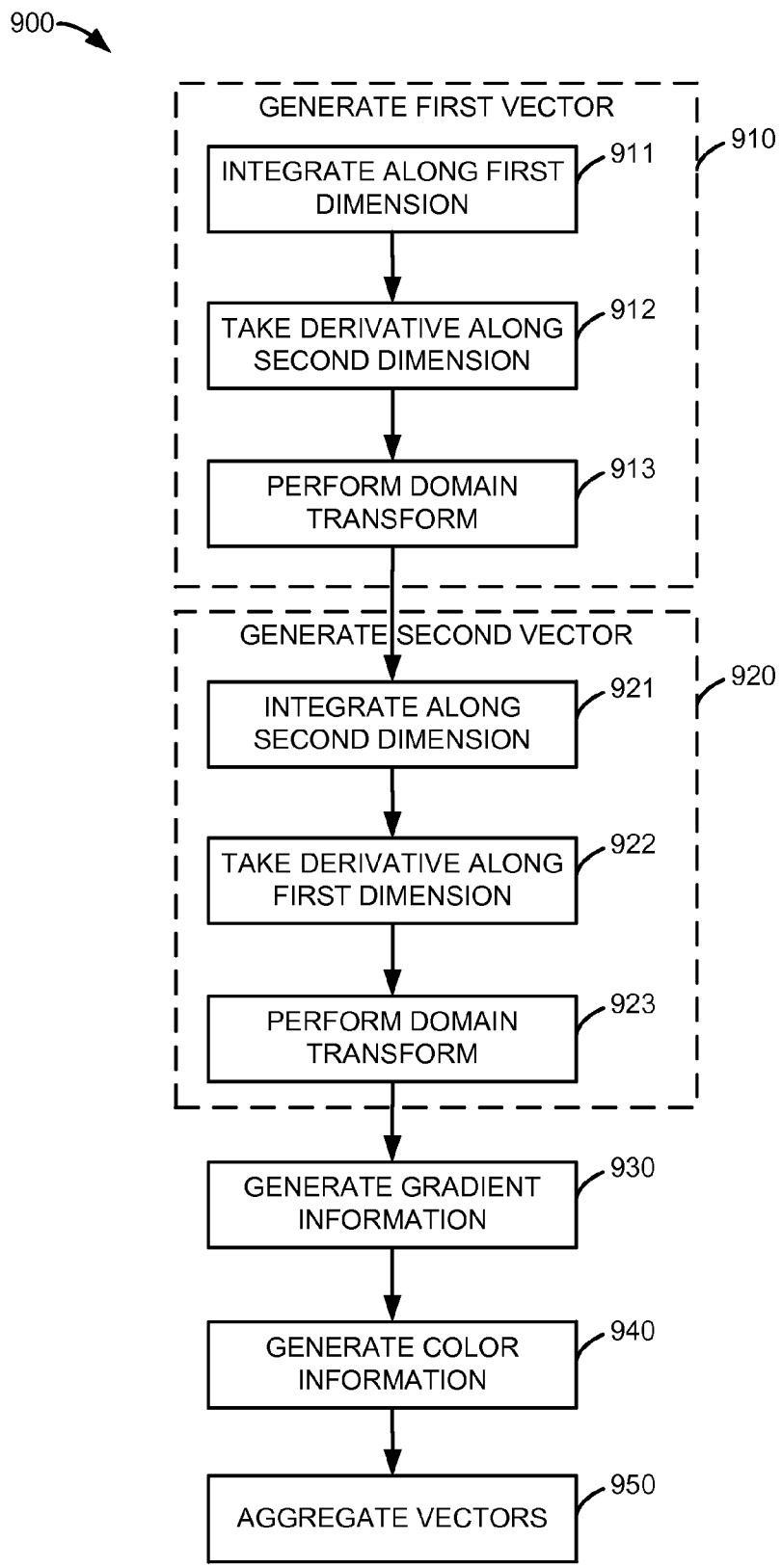
FIG. 9 is a flowchart of a process to generate an appearance-invariant signature for a graphical object, according to an implementation.

FIG. 9 is a flowchart of a process to generate an appearance-invariant signature for a graphical object, according to an implementation. Process 900 can be implemented as a hardware module, as a software module hosted at a computing device, and/or as a combination of a hardware module and a software module. For example, process 900 can be implemented as application-specific circuitry or as a software module including instructions stored at a memory and executed at a processor in communication with the memory. More specifically, for example, process 900 can be implemented at a signature generation module.

Process 900 is an example methodology to generate an appearance-invariant signature for a graphical object. As illustrated in FIG. 9, an appearance-invariant signature can be a composite signature (i.e., the signature includes multiple portions) generated from a multi-dimensional (here, two-dimensional) representation of a graphical object. For example, the multi-dimensional representation of the graphical object can be a two-dimensional bitmap of the graphical object. More specifically, a first signature vector (i.e., a first component or portion of an appearance-invariant signature) is generated at 910 and a second signature vector is generated at block 920 for the representation of a graphical object. The first and second signature vectors can also be referred to as signals. Thus, an appearance-invariant signature can include multiple signals.

The first signature vector is generated by integrating along a first dimension of the representation of the graphical object at block 911. A derivative of the result vector (or signal) of the integrating is then determined (or taken) along the second dimension of the representation of the graphical object at block 912. For example, a two-dimensional bitmap of the representation of the graphical object can be integrated along the y-axis and the derivative along the x-axis of the result can then be taken.

The result vector of the derivative is then transformed into a different domain at block 913. For example, the result vector of the derivative can be transformed to the log-domain. Additionally, other transformations of the result vector can also be performed in conjunction with or in place of the transform to the log-domain. As a specific example, a Fourier transform is performed on the result vector of the derivative and the phase components are discarded (i.e., to retain only the magnitude components of the Fourier transform). The result vector of the Fourier transform is then transformed into the log-domain. Finally, a Fourier transform is performed on the result vector of the log-domain transform and the phase components are discarded (i.e., to retain only the magnitude components of the Fourier transform). The result vector of block 913 is the first signature vector generated at block 910.

Similarly, the second signature vector is generated by integrating along the second dimension of the representation of the graphical object at block 921. A derivative of the result vector of the integrating is then taken along the first dimension of the representation of the graphical object at block 922. For example, a two-dimensional bitmap of the representation of the graphical object can be integrated along the x-axis and the derivative along the y-axis of the result can then be taken. That is, the integral is taken along the dimension at block 921 along which the derivative was taken at block 912, and the derivative is taken along the dimension at block 922 along which the integral was taken at block 911.

The result vector of the derivative is then transformed into a different domain at block 923. For example, the result vector of the derivative can be transformed to the log-domain. Additionally, other transformations of the result vector can also be performed in conjunction with or in place of the transform to the log-domain. As a specific example, a Fourier transform is performed on the result vector of the derivative and the phase components are discarded. The result vector of the Fourier transform is then transformed into the log-domain. Finally, a Fourier transform is performed on the result vector of the log-domain transform and the phase components are discarded. The result vector of block 923 is the second signature vector generated at block 920.

An appearance-invariant signature for a graphical object can also include additional components or signals. As illustrated in FIG. 930, gradient information related to the graphical object can be generated (or calculated) to be included at the appearance-invariant signature. As an example, a histogram of the gradient angles of the graphical object can be calculated from the representation of the graphical object. The histogram can be another vector (or signal or component) that is included within the appearance-invariant signature.

Moreover, color information related to a graphical object can be generated (or calculated) from the representation of the graphical object at block 940. For example, a percentage (i.e., a value representing a percentage) of the graphical object that is within a range of color values (i.e., values within the representation of the graphical object that represent colors) can be determined. In some implementations, a group of values that represent the percentages of the graphical object that are within various ranges of color values can be generated at block 940. Such a value or values are another vector (or signal or component) that is included within the appearance-invariant signature.

The vectors generated at process 900 (e.g., the results of blocks 910, 920, 930, and 940) are aggregated (or combined) at block 950 to define the appearance-invariant signature. In one implementation, the first signature vector, the second signature vector, the gradient information, and the color information are concatenated (in the order generated) to define the appearance-invariant signature. In other words, the appearance-invariant signature is a composite of the first signature vector, the second signature vector, the gradient information, and the color information.

Process 900 can include addition or fewer blocks than those illustrated in FIG. 9. Additionally, one or more blocks can be rearranged. For example, process 900 can be implemented at signature generation module operable to generate multiple signature vectors in parallel and the first signature vector and the second signature vector are generated concurrently. Furthermore, although process 900 is discussed above with reference to an example environment including a signature generation module, process 900 is applicable within other environments.

Figure 10:
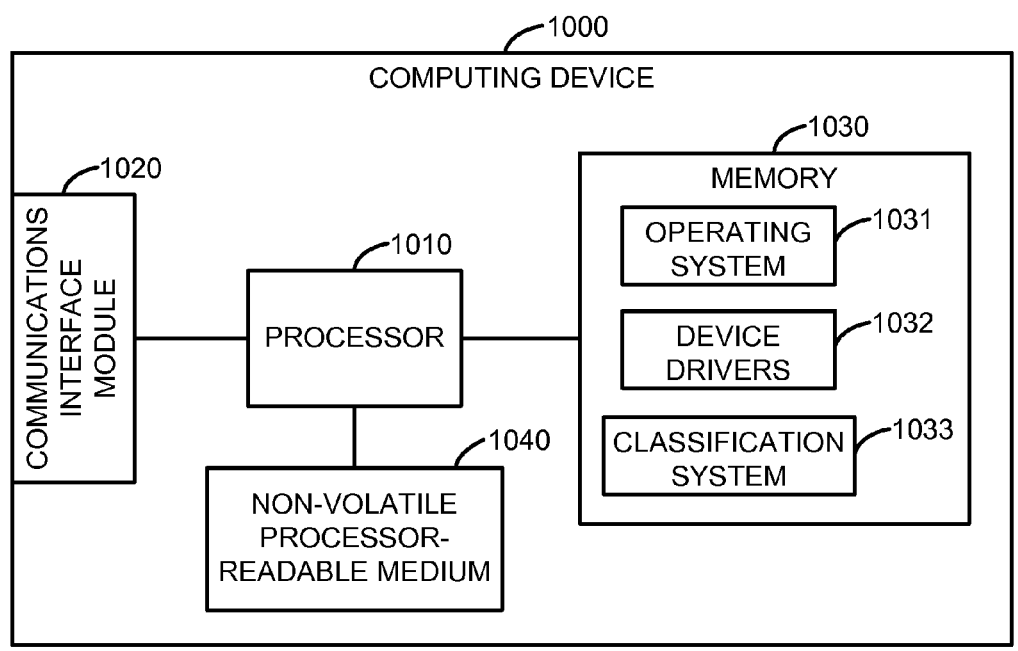
FIG. 10 is a schematic block diagram of a computing device configured as a classification system, according to an implementation.

FIG. 10 is a schematic block diagram of a computing device configured as a classification system, according to an implementation. That is, a classification system can be hosted (i.e., implemented as codes that when executed at the computing device cause the computing device—or a processor or processors of the computing device—to perform, for example, process 400 to classify graphical objects) at computing device 1000. Computing device 1000 can be referred to as a classification system when hosting a classification system. As illustrated in FIG. 10, computing device 1000 includes communications interface module 1020, processor 1010, memory 1030, and non-volatile (i.e., non-transitory) processor-readable medium 1040. Processor 1010 is operatively coupled to communications interface module 1020, memory 1030, and non-volatile processor-readable medium 1040.

Processor 1010 is any of a variety of processors. For example, processor 1010 can be a general-purpose processor or an application-specific processor and can be implemented as hardware and/or software hosted at hardware. Hardware is, for example, a microprocessor, a microcontroller, an application-specific integrated circuit ("ASIC"), a programmable logic device ("PLD") such as a field programmable gate array ("FPGA"), and/or other circuitry that performs operations. Software is, for example, processor-executable instructions, commands, codes, firmware, and/or programming stored at a memory and executed (or hosted) at a processor. Software can be defined using one or more programming languages such as Java™, C++, C, an assembly language, a hardware description language, and/or another suitable programming language. For example, a processor can be a virtual machine hosted at a computer server including a microprocessor and a memory.

In some implementations, processor 1010 can include multiple processors. For example, processor 1010 can be a microprocessor including multiple processing engines (e.g., computation, algorithmic or thread cores). As another example, processor 1010 can be a computing device including multiple processors with a shared clock, memory bus, input/output bus, and/or other shared resources. Furthermore, processor 1010 can be a distributed processor. For example, processor 1010 can include multiple computing devices, each including a processor, in communication one with another via a communications link such as a computer network.

Memory 1030 can be separate from processor 1010 or can be external and accessible to processor 1010. Typically, as illustrated in FIG. 10, memory 1030 includes processor-executable instructions or codes (e.g., computer codes or object codes) defining software that is executed by processor 1010 during operation of computing device 1010. For example, memory 1030 can be a random-access memory ("RAM") that includes processor-executable instructions that define operating system 1031, device drivers 1032, and classification system 1033 (e.g., a software application that implements a process such as process 400). In other words, operating system 1031, device drivers 1032, classification system 1033, and other software stored as processor-executable instructions (not shown) at memory 1030 and executed at processor 1010 are hosted at computing device 1000 (or at processor 1010). Classification system 1033 can include components such as, for example, an acquisition module, a signature generation module, and a classification module. The components of classification system 1033 can be implemented as subroutines, functions, software libraries (e.g., statically-linked libraries and/or dynamically-linked or -loaded libraries), and/or other modules of classification system 1033.

Typically, operating system 1031, device drivers 1032, classification system 1033, other software applications (i.e., processor-executable codes or instructions that implement software applications when hosted at a processor) and/or data values are stored at non-volatile processor-readable medium 1040. In some embodiments, processor 1010 transfers or loads operating system 1031, device drivers 1032, classification system 1033, the other software applications, and/or data values into memory 1030 during an initialization or boot sequence of computing device 1000, and operating system 1031, device drivers 1032, classification system 1033, the other software applications, and/or data values are accessed or executed from memory 1030 during operation of computing device 1000. That is, non-volatile processor-readable medium 1040 can function as a persistent or non-transient data store or memory for the codes, instructions, data value, and/or other information stored during operation of computing device 1000 at memory 1030. Thus, memory 1030 and non-volatile processor-readable medium 1040 can be referred to generically as memory of computing device 1000.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and RAM. In other words, processor-readable media are media from which a processor can access information (e.g., processor-executable instructions or codes and/or data values). Thus, non-volatile processor-readable medium 1040 is a processor readable memory and memory 1030 is also a processor-readable medium.

Examples of processor-executable code or instructions (e.g., computer code or instructions) include, but are not limited to, micro-code or micro-instructions, machine instructions, such as produced by a compiler, and files containing higher-level instructions that are executed by a computer using an interpreter. For example, an implementation may be realized or implemented using Java™, C++, a script interpreter, or other object-oriented programming language and development tools. Additional examples of processor-executable code include, but are not limited to, script instructions, encrypted code, and compressed code.

Non-volatile processor-readable medium 1040 can be, for example, a hard disk within computing device 1000 that includes software loaded or copied to non-volatile processor-readable medium 1040 from another processor-readable medium such as a DVD or CD. In some implementations, non-volatile processor-readable medium 1040 can be external to or removable from computing device 1000. For example, non-volatile processor-readable medium 1040 can include a Universal Serial Bus™ ("USB") interface (or interface module) and non-volatile processor-readable medium 1040 can be FLASH memory device with a USB interface. In other implementations, non-volatile processor-readable medium 1040 can be integrated with processor 1010. In yet other implementations, non-volatile processor-readable medium 1040 can be remote from computing device 1000 and computing device 1000 can access non-volatile processor-readable medium 1040 via a communications link (e.g., a computer network). As a specific example, non-volatile processor-readable medium 1040 can be (or be at) a data store or data storage service accessible via a communications link operatively coupled to communications interface module 1020. Computing device 1000 can boot by copying processor-executable codes or instructions from non-volatile processor-readable medium 1040 to memory 1030 via communications interface module 1020, and executing the processor-executable codes or instructions at processor 1010.

Communications interface module 1020 is an interface accessible to processor 1010 to communicate with (i.e., transmit symbols representing data to and receive such symbols from) other processors and/or computing devices via a communications link. In other words, communications interface module 1020 can receive data from processor 1010 and transmit symbols representing those data via a communications link. In some implementations, classification system 1033 outputs information related to classification of graphical objects via communications interface module 1020.

Moreover, communications interface module 1020 can receive symbols from other communications interface modules via a communications link and send data represented by those symbols to processor 1010. For example, communications interface module 1020 can be a telephone network interface, a twisted-pair network interface, a coaxial network interface, a fiber-optic network interface, a wireless network interface such as a wireless local area network ("WLAN") or a cellular network, and/or some other network or communications interface module.

In some implementations, computing device 1000 can include additional modules or components. For example, computing device 1000 can include a graphical interface module (not shown) to provide signals to a display to output information relation to classification of graphical objects. That is, computing device 1000 can output, for example, identifiers of the classes within which classification system 1033 classifies graphical objects.

Figure 11:
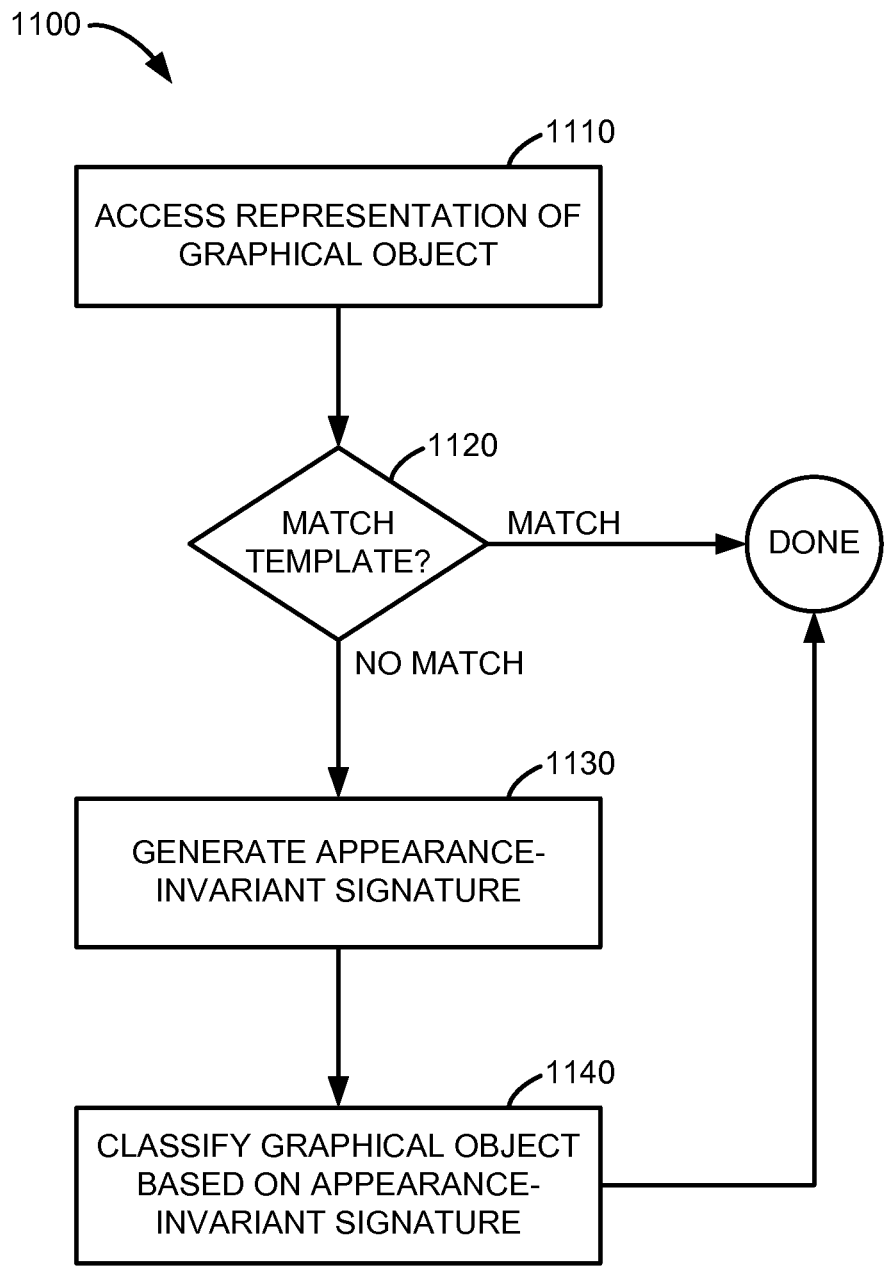
FIG. 11 is a flowchart of a process to classify a graphical object, according to an implementation.

FIG. 11 is a flowchart of a process to classify a graphical object, according to an implementation. Process 1100 can be implemented as a hardware module, as a software module hosted at a computing device, and/or as a combination of a hardware module and a software module. For example, process 1100 can be implemented as application-specific circuitry or as a software module including instructions stored at a memory and executed at a processor in communication with the memory.

A representation of a graphical object is accessed at block 1110. The representation of the graphical object is then compared with a group of templates of representations of graphical objects to determine whether the representation of the graphical object matches (or satisfies) a template at block 1120. If the representation of the graphical object matches a template, the graphical object is classified in a class associated with the template. That is, the template is associated with a class and the graphical object is classified into the class associated with the template if the representation of the graphical object matches the template.

If the representation of the graphical object does not match (or satisfy) a template at block 1120, process 1100 proceeds to block 1130 at which an appearance-invariant signature of the representation of the graphical object is generated. For example, the appearance-invariant signature can be generated as discussed above in relation to FIG. 4. The graphical object is then classified based on the appearance-invariant signature at block 1140. For example, a classification module determines into which class a graphical object will be classified based on the appearance-invariant signature for the graphical object.

Process 1100 can include addition or fewer blocks than those illustrated in FIG. 11. Additionally, one or more blocks can be rearranged. Furthermore, process 1100 is applicable within many environments. For example, process 1100 can be implemented at a computing device including multiple processors and in communication with various processor-readable media that is configured to host a classification system.

Figure 12:
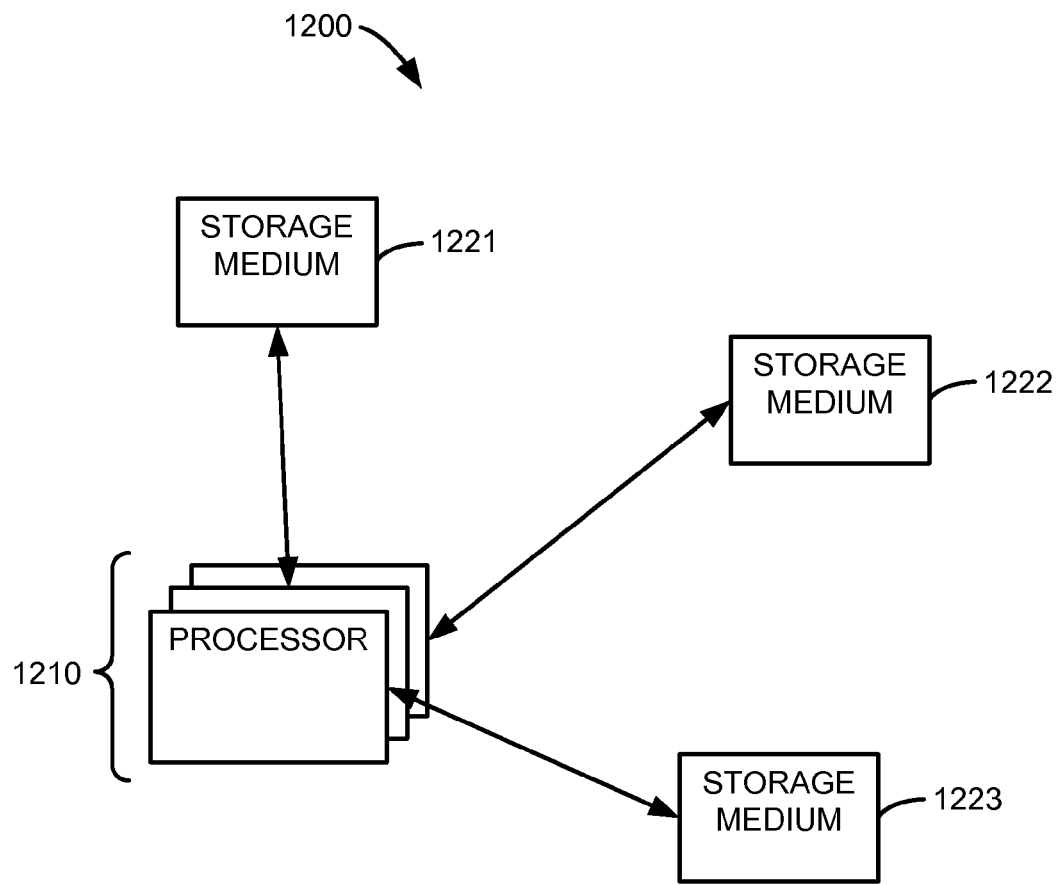
FIG. 12 is a schematic block diagram of a system including a processor and storage media, according to an implementation.

As an example of a system including one or more processors and processor-readable storage media, FIG. 12 is a schematic block diagram of system 1200 including a processor and storage media, according to an implementation. As illustrated in FIG. 12, system 1200 includes one or more processors 1210 operatively coupled to storage medium 1221, storage medium 1222, and storage medium 1223. One or more processors 1210 can access instructions or code at storage medium 1221, storage medium 1222, and storage medium 1223. Storage media 1221, 1222, and 1223 can be any processor-readable media and/or related devices to access processor-readable media. For example, storage medium 1221 can be a hard disk drive including a magnetic storage medium, storage medium 1222 can be an optical drive such as a DVD drive and can accept DVD storage media on which processor-readable instructions such as processor-readable instructions that implement a report generation tool can be stored, and storage medium 1223 can be a FLASH memory drive with a Universal Serial Bus ("USB") interface. In some implementations, storage media 1221, 1222, and/or 1223 can be local to (e.g., coupled to a common computing device) one or more processors 1210. In some implementations, storage media 1221, 1222, and/or 1223 can be remote from (e.g., coupled to a separate computing device) one or more processors 1210 and in communication with one or more processors 1210 via communications link. Furthermore, one or more of storage media 1221, 1222, and/or 1223 can be local to one or more processors 1210 and one or more of the remaining of storage media 1221, 1222, and/or 1223 can be remote from one or more processors 1210.

As a more specific example, one or more processors 1210 can be included within a computing device such as a communications device having an internal hard disk drive data store represented by storage medium 1221 and a removable solid-state data store such as a Secure Digital High-Capacity ("SDHC") memory card represented by storage medium 1222. The computing device can also include a USB host controller to communicate with a USB FLASH memory drive represented by storage medium 1223. One or more processors 1210 can access processor-readable instructions such as processor-readable instructions that implement an operating system, software application such as a classification system, and/or one or more processes at any of storage media 1221, 1222, and/or 1223. Said differently, one or more processors 1210 can interpret or execute instructions at processor-readable media via storage medium 1221, storage medium 1222, and/or storage medium 1223. For example, a computing device can execute a classification system stored at a remote storage medium.

Alternatively, for example, storage media 1221 and 1222 can be remote from a computing device including one or more processors 1210 and storage medium 1223 can be local to that computing device. The computing device including one or more processors 1210 can download a classification system from one or both of remote storage media 1221 or 1222 via communications link such as a communications network to local storage medium 1223 and execute the classification system from local storage medium 1223.

In some implementations, system 1200 can include one or more memories such as RAM that function as a cache between one or more of storage medium 1221, storage medium 1222, and/or storage medium 1223 and one or more processors 1210 for instructions or code stored (or accessible) at one or more of storage medium 1221, storage medium 1222, and/or storage medium 1223.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As a specific example, implementations discussed in relation to graphical user interfaces, controls of graphical user interface, and/or software automation are applicable to other environments. Furthermore, it should be understood that the systems and methods described herein can include various combinations and/or sub-combinations of the components and/or features of the different implementations described. Thus, features described with reference to one or more implementations can be combined with other implementations described herein.

What is claimed is:

1. A graphical object classification system, comprising:
a processor; and
a non-transitory processor-readable medium comprising:
an acquisition module to access a two dimensional bitmap representation of a graphical object generated from a parsed screenshot of a graphical user interface (GUI);
a signature generation module to generate an appearance-invariant signature of the graphical object based on the bitmap representation of the graphical object, wherein the appearance-invariant signature comprises a composite of two or more signature vectors that vary little in response to changes in shape, size, orientation, and visual layer appearance of the graphical object, and each of the signature vectors includes attributes based on operations on the bitmap representation of the graphical object comprising integration along a first dimension, differentiation of the integration along a different second dimension, and domain transformation of the differentiation into at least one of Fourier magnitude components and log-domain transforms; and
a classification module to classify the graphical object based on the appearance-invariant signatures, wherein the graphical object is classified into a class and the graphical object after a change in appearance is classified into the same class when the respective appearance-invariant signatures before and after the change share substantially common attributes.

2. The system of claim 1, wherein the signature generation module is operable to:
generate a first signature vector comprising a first collection of attributes from the bitmap representation of the graphical object;
generate a second signature vector comprising a second collection of attributes from the bitmap representation of the graphical object; and
composite the first signature vector and the second signature vector into multiple portions.

3. The system of claim 1, wherein the signature generation module is operable to:
- generate a first signature vector comprising a first collection of attributes from the bitmap representation of the graphical object based on a first integral along a first dimension of the bitmap representation of the graphical object, a first derivative of the first integral along a second dimension of the bitmap representation of the graphical object different from the first dimension, and a first domain transform of the first derivative;
- generate a second signature vector comprising a second collection of attributes from the representation of the graphical object based on a second integral along the second dimension, a second derivative of the second integral along the first dimension, and a second domain transform of the second derivative; and
- composite the first signature vector and the second signature vector into multiple portions.

4. The system of claim 1, wherein the signature generation module is operable to include gradient information generated from the bitmap representation of the graphical object, wherein the gradient information is a histogram of gradient angles of the graphical object calculated from the bitmap representation of the graphical object and the gradient information is an additional signature vector composited to the appearance-invariant signature.

5. The system of claim 1, wherein color information related to the graphical object is generated from the bitmap representation of the graphical object and the color information is an additional signature vector composited to the appearance-invariant signature.

6. The system of claim 1, wherein the classification module is a support vector machine (SVM) based classification module, wherein the SVM has been configured using a supervised training procedure in which groups of appearance-invariant signatures for each of a variety of classes were provided to the SVM to generate support vectors for use by the SVM to discriminate between appearance-invariant signatures of graphical objects from the variety of classes.

7. The system of claim 1, wherein the classification module is operable to:
- compare the bitmap representation of the graphical object with a template;
- determine that the bitmap representation of the graphical object does not satisfy the template; and
- provide the appearance-invariant signature to a support vector machine module in response to the determining.

8. The system of claim 1, wherein the acquisition module applies an edge-detection filter to the GUI and selects portions of the GUI for which the edge-detection filter generates rectangular features.

9. A processor-readable medium storing code representing instructions to cause a processor to perform a process, the process comprising:
- receiving a plurality of two dimensional bitmap graphical object representations of a parsed screenshot of a graphical user interface (GUI), each bitmap graphical object representation associated with a graphical object from a plurality of graphical objects, each graphical object associated with an object class from a plurality of object classes;
- generating a plurality of appearance-invariant signatures, each appearance-invariant signature based on the bitmap graphical object representation of a graphical object from the plurality of graphical objects and associated with that graphical object, wherein the appearance-invariant signature comprises a composite of two or more signature vectors that vary little in response to changes in shape, size, orientation, and visual layer appearance of the graphical object, and each of the signature vectors includes attributes based on operations on the bitmap representation of the graphical object comprising integration along a first dimension, differentiation of the integration along a different second dimension, and domain transformation of the differentiation into at least one of Fourier magnitude components and log-domain transforms; and
- classifying each graphical object into an object class from the plurality of object classes based on a composite of two or more of the appearance-invariant signature associated with that graphical object, wherein each graphical object is classified into the object class and the respective graphical object after a change in appearance is classified into the same object class when the respective appearance-invariant signatures before and after the change share substantially common attributes.

10. The processor-readable medium of claim 9, wherein the generating a plurality of appearance-invariant signatures includes:
- generating for each appearance-invariant signature a first signature vector of attributes from the bitmap graphical object representation of the graphical object associated with that appearance-invariant signature;
- generating for each appearance-invariant signature a second signature vector of attributes from the bitmap graphical object representation of the graphical object associated with that appearance-invariant signature; and
- compositing the first signature vector and the second signature vector for each appearance-invariant signature within that appearance-invariant signature into multiple portions.

11. The processor-readable medium of claim 9, wherein each appearance-invariant signature includes a representation of a plurality of gradients generated from the bitmap graphical object representation of the graphical object associated with that appearance-invariant signature, wherein each of the plurality of gradients is a histogram of gradient angles of the graphical object calculated from the bitmap graphical object representation and the gradient information is an additional signature vector composited to the appearance-invariant signature.

12. The processor-readable medium of claim 9, wherein the classifying includes providing the appearance-invariant signature associated with each graphical object to a support vector machine (SVM) module, wherein the SVM has been configured using a supervised training procedure in which groups of appearance-invariant signatures for each of a variety of classes were provided to the SVM to generate support vectors for use by the SVM to discriminate between appearance-invariant signatures of graphical objects from the variety of classes.

13. The processor-readable medium of claim 9, further comprising:
- generating color information related to the graphical object from the bitmap representation of the graphical object; and
- compositing the color information to the appearance-invariant signature as an additional signature vector.

14. The processor-readable medium of claim 9, wherein accessing the bitmap representation of a graphical object includes applying an edge-detection filter to the GUI and selecting portions of the GUI for which the edge-detection filter generates rectangular features.

15. A graphical object classification method, the process comprising:
- accessing a two dimensional bitmap representation of a graphical object from a parsed screenshot of a graphical user interface (GUI);
- generating a plurality of signature vectors from the representation, wherein each of the signature vectors comprises attributes that vary little in response to changes in shape, size, orientation, and visual layer appearance of the graphical object, and each of the signature vectors includes attributes based on operations on the bitmap representation of the graphical object from the group comprising integration along a first dimension, differentiation of the integration along a different second dimension, and domain transformation of the differentiation into at least one of Fourier magnitude components and log-domain transforms;
- compositing each signature vector from the plurality of signature vectors to define an appearance-invariant signature of the graphical object; and
- classifying each graphical object based on the appearance-invariant signature, wherein the graphical object is classified into a class and the graphical object after a change in appearance is classified into the same class when the respective appearance-invariant signatures before and after the change share substantially common attributes.

16. The method of claim 15, further comprising:
- including color information generated from the bitmap representation of the graphical object; and
- compositing the color information as an additional signature vector to the appearance-invariant signature.

17. The method of claim 15, wherein compositing each signature vector from the plurality of signature vectors to define the appearance-invariant signature of the graphical object comprises concatenating a first signature vector associated with a first axis of the graphical object, a second signature vector associated with a second axis of the graphical object, a third signature vector associated with a plurality of gradient information generated from the bitmap representation of the graphical object, and a fourth signature vector associated with a plurality of color information generated from the bitmap representation of the graphical object.

18. The method of claim 15, wherein generating the plurality of signature vectors includes:
- generating a first signature vector from a first integral of the bitmap representation in the first dimension, generating a first derivative of the first integral in the second dimension, and generating a first domain transform of the first derivative;
- generating a second signature vector from a second integral of the bitmap representation in the second dimension, generating a second derivative of the second integral in the first dimension, and generating a second domain transform of the second derivative; and
- compositing the first signature vector and the second signature vector for the appearance-invariant signature into multiple portions.

19. The method of claim 18, wherein each dimension of the plurality of signature vectors is associated with an axis of the graphical object.

20. The method of claim 15, further comprising:
- including gradient information generated from the bitmap representation, wherein the gradient information is a histogram of gradient angles of the graphical object calculated from the bitmap representation of the graphical object and the gradient information is an additional signature vector composited to the appearance-invariant signature.

* * * * *